May 29, 1923.

M. MAHER

BOILER TUBE CUTTER

Filed Aug. 22, 1922

1,457,258

WITNESSES
Edw. Thorpe

INVENTOR
Michael Maher
BY
ATTORNEYS

Patented May 29, 1923.

1,457,258

UNITED STATES PATENT OFFICE.

MICHAEL MAHER, OF BAY CITY, MICHIGAN.

BOILER-TUBE CUTTER.

Application filed August 22, 1922. Serial No. 583,546.

*To all whom it may concern:*

Be it known that I, MICHAEL MAHER, a citizen of the United States of America, and a resident of Bay City, in the county of Bay and State of Michigan, have invented a new and Improved Boiler-Tube Cutter, of which the following is a description.

My invention relates to a tool to be inserted in a boiler tube for cutting the latter. The invention has for its general object to provide a boiler tube cutter improved in various particulars especially with regard to simplifying the construction and promoting convenience and efficiency in the cutting of the tube.

The nature of the invention and its distinguishing features and characteristics will clearly appear as the description proceeds.

Reference is to be had to the accompanying drawings forming a part of this specification, it being understood that the drawings are merely illustrative of one example of the invention.

Figure 1:
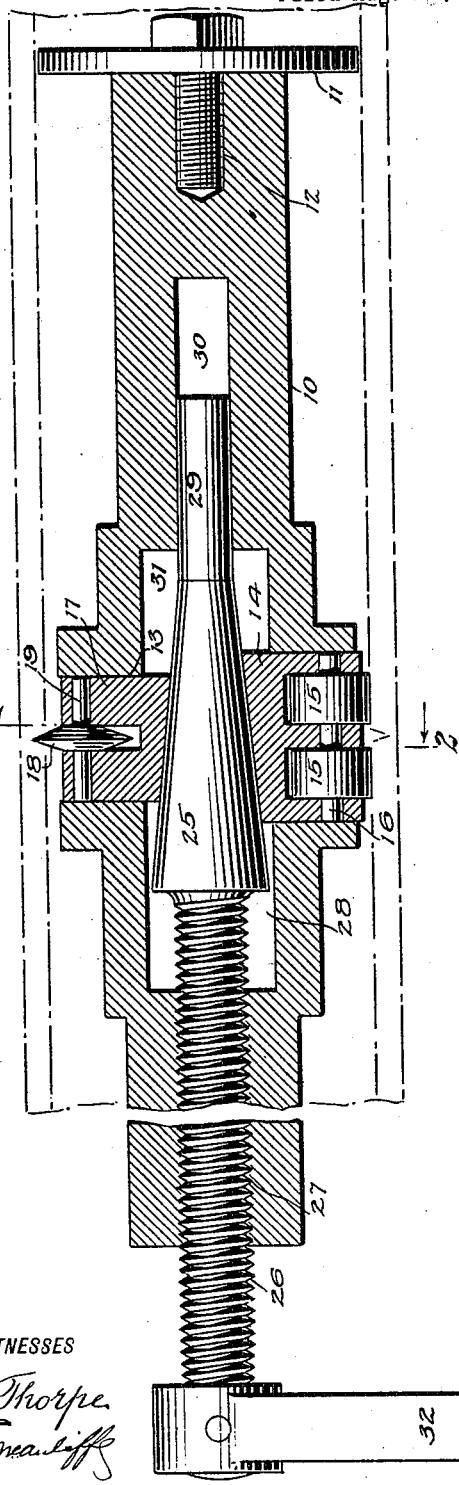
Figure 1 is a longitudinal section of a boiler tube cutter embodying my invention.
Figure 2:
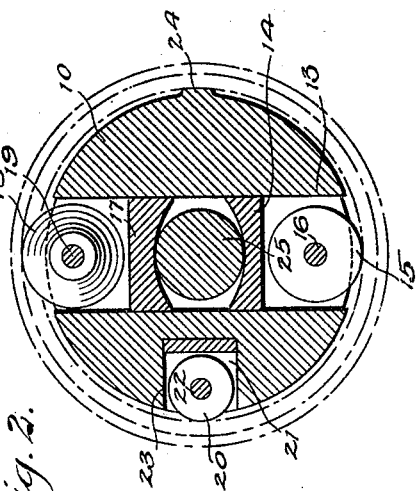
Figure 2 is a transverse section as indicated by the line 2—2, Figure 1.

In carrying out my invention in accordance with the illustrated example an elongated body 10 is provided generally cylindrical adapted to be inserted in the boiler tube to be cut, said body having at the front end a head 11 in the form of a disk secured by a stud bolt 12 passing axially therethrough and into the body 10, said head 11 in practice fitting approximately the tube to be cut.

Adjacent the transverse center of the body 10 the same is formed with a transverse slot 13 and in said slot is fitted a block 14 carrying a pair of rollers 15 and a pin 16, approximately parallel with the axis of the tool, said rollers adapted to bear against the tube at the interior. Diametrically opposite the rollers 15 I provide in the slot 13 a second block 17 carrying a rotary cutter 18 on a pin 19 parallel with the pin 16. Contributing to the centering of the pull in the tube is a roller 20 about 90° from the rollers 15 and cutter 18, said roller 20 turning on a pin 22 in a block 21 fitted in the recess 23 in the tool at right angles to the slot 13 and diametrically opposite said roller 20 a longitudinal bead 24 is formed on the tool at the periphery to bear against the tube.

The rollers 15 and cutter 18 are adapted to be extended radially outward by a cone 25 on a threaded stem 26 of considerable length to possess strength and to prevent damage to the threads. The threads of the shank 26 engage internal threads 27 in the bore of the body 10 at the rear end, there being a counter-bore 28 accommodating the enlarged end of the cone 25 at the rear of the cutter and roller assemblage. At the front end of the cone 25 and integral therewith is a cylindrical pilot spindle 29 movable axially and turnable in the reduced front end 30 of the bore or body 10, there being a counter-bore 31 at the rear end of the bore 30 to accommodate the front end of the cone 25. The screw 26 has a suitable crank handle 32 for turning the same.

With the described construction the turning of the screw 26 by the handle 32 will turn and advance the cone 25 thereby causing the rollers 15 and cutter 18 to move radially outward so that the cutter severs the tube. Said cutter 18 is in a transverse plane passing between the pair of rollers 15 so that the latter center and steady the tool and take the thrust in cutting the tube.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claim.

Having thus described my invention, I claim:

A tube cutter including a body adapted to be inserted into the tube to be cut, a cylindrical chamber formed in said body, said chamber merging at one end into a blind bore and at the other into a threaded bore, a cone formed at one end with a spindle to fit into said blind bore and at the other with a threaded shank guided in said threaded bore arranged in said cylindrical chamber, said body adjacent its center between its ends presenting an opening merging into said cylindrical chamber, and a block carrying a circular cutter at one side and formed at the other with a tapering face transversely curved and longitudinally arranged in said opening, said tapering face of said block mating with the tapering surface of the cone so as to move laterally when the cone is moved longitudinally.

MICHAEL MAHER.